US012698891B2

(12) United States Patent
Li et al.

(10) Patent No.: US 12,698,891 B2
(45) Date of Patent: Aug. 4, 2026

(54) LIGHTING APPARATUS

(71) Applicant: LEEDARSON LIGHTING CO., LTD., Zhangzhou (CN)

(72) Inventors: Kunbin Li, Zhangzhou (CN); Huitang Zhang, Zhangzhou (CN)

(73) Assignee: LEEDARSON LIGHTING CO., LTD., Zhangzhou (CN)

( * ) Notice: Subject to any disclaimer, the term of this patent is extended or adjusted under 35 U.S.C. 154(b) by 0 days.

(21) Appl. No.: 19/038,541

(22) Filed: Jan. 27, 2025

(65) Prior Publication Data

US 2025/0243998 A1 Jul. 31, 2025

(30) Foreign Application Priority Data

Jan. 26, 2024 (CN) ......................... 202420193961.8
Jan. 26, 2024 (CN) ......................... 202420193970.7

(51) Int. Cl.

| | |
|---|---|
| ***F21V 23/00*** | (2015.01) |
| ***F21V 17/00*** | (2006.01) |
| ***F21V 17/10*** | (2006.01) |
| ***F21V 17/18*** | (2006.01) |
| *F21Y 103/10* | (2016.01) |
| *F21Y 113/00* | (2016.01) |
| *F21Y 115/10* | (2016.01) |

(52) U.S. Cl.

CPC .......... *F21V 23/003* (2013.01); *F21V 17/005* (2013.01); *F21V 17/101* (2013.01); *F21V 17/18* (2013.01); *F21Y 2103/10* (2016.08); *F21Y 2113/00* (2013.01); *F21Y 2115/10* (2016.08)

(58) Field of Classification Search

CPC .... F21V 23/003; F21V 17/005; F21V 17/101; F21V 17/18; F21Y 2103/10; F21Y 2115/10; F21Y 2113/00

See application file for complete search history.

(56) References Cited

U.S. PATENT DOCUMENTS 5,171,085 A * 12/1992 Jaksich .................. F21V 17/16 362/147
5,184,881 A * 2/1993 Karpen ................. F21V 31/005 362/217.09
6,601,976 B1 * 8/2003 Rhee ..................... F21V 17/007 362/225
2013/0033859 A1 * 2/2013 Yaphe ..................... F21V 5/007 362/223
2019/0049100 A1 * 2/2019 Seligman .............. F21V 21/025
2023/0250929 A1 * 8/2023 Doubek ............... G02B 6/0081 362/633

* cited by examiner

*Primary Examiner* — Bao Q Truong
(74) *Attorney, Agent, or Firm* — LANWAY IPR SERVICES; Chun-Ming Shih

(57) ABSTRACT

A lighting apparatus includes a back cover, a light source, a surrounding wall and a light cover. The light source is disposed to an inner side of the back cover. The surrounding wall has a top edge and a bottom edge. The back cover is attached to the top edge of the surrounding wall. The light cover has a top ridge and a bottom ridge. The top ridge and the bottom ridge of the light cover are disposed to clip a protruding structure of the surrounding wall to fix the light cover to the surrounding wall. The light of the light source is emitted downwardly and passes through the light cover.

19 Claims, 9 Drawing Sheets

LIGHTING APPARATUS

FIELD

The present invention is related to a lighting apparatus, and more particularly related to a light apparatus with a compact design.

BACKGROUND

LED technology has revolutionized light device design, becoming the standard for modern illumination due to its unparalleled efficiency and versatility. Unlike traditional light sources such as incandescent or fluorescent bulbs, LEDs (light-emitting diodes) are highly energy-efficient, converting a significant portion of electrical energy into visible light with minimal heat loss. This efficiency not only reduces energy consumption but also translates into lower electricity bills and a smaller environmental footprint, making LEDs an eco-friendly choice for both residential and commercial lighting.

Another advantage of LED technology is its remarkable durability and longevity. LEDs can operate for tens of thousands of hours, far outlasting traditional light bulbs. This extended lifespan reduces the frequency of replacements, which is particularly valuable in hard-to-reach installations or applications requiring constant, reliable lighting. Additionally, the robust construction of LEDs, often encapsulated in solid-state materials, makes them resistant to shock, vibrations, and extreme temperatures, enhancing their reliability in diverse environments.

LEDs also offer unparalleled design flexibility, enabling the creation of innovative lighting devices tailored to specific needs. Their small size and directional light output make them suitable for compact, intricate designs, such as decorative fixtures or task lighting. Furthermore, advancements in LED technology allow for precise control over color, brightness, and beam angle, which designers can leverage to create dynamic lighting effects or meet stringent performance criteria. This versatility is why LEDs are commonly used in applications ranging from architectural lighting to automotive headlights and beyond.

A significant benefit of LEDs is their compatibility with smart lighting systems, which are increasingly in demand for home automation and energy management. LEDs can be seamlessly integrated with dimmers, sensors, and controllers, offering users the ability to adjust brightness, color temperature, or even light patterns through mobile apps or voice commands. This integration not only enhances convenience but also provides data-driven insights into energy usage, allowing for further optimization of lighting systems to save costs and reduce waste.

The environmental benefits of LED technology extend beyond energy efficiency. LEDs are free from toxic elements like mercury, commonly found in fluorescent lights, making them safer for disposal and recycling. Additionally, their lower energy requirements reduce the strain on power grids and decrease greenhouse gas emissions associated with electricity production. As governments and industries worldwide adopt stricter sustainability goals, the widespread implementation of LED lighting plays a crucial role in achieving these targets while maintaining high-quality illumination.

Maintaining compatibility with traditional dimmer designs while incorporating the new technology of LEDs is critical for ensuring a seamless transition to modern lighting systems. Traditional dimmers, commonly found in homes and commercial spaces, were originally designed for incandescent bulbs and operate by cutting the AC waveform to adjust brightness. LED technology, with its distinct electrical properties, often requires specialized circuits or drivers to work with these dimmers effectively. By designing LED lighting systems that remain compatible with existing dimmers, manufacturers can simplify the adoption process for consumers, eliminating the need for costly rewiring or replacement of dimmer infrastructure.

This compatibility is particularly beneficial for retaining the user-friendly features and familiar interfaces of traditional dimmers. Many consumers and professionals rely on the tactile control and simplicity of existing dimmer switches, which are widely installed and understood. By ensuring that LED systems integrate seamlessly with these dimmers, manufacturers can offer a consistent user experience while delivering the energy efficiency, longevity, and advanced features of LED technology. Compatibility also opens up opportunities for mixed-use environments where both traditional and LED lighting may coexist, providing flexibility in upgrading lighting systems incrementally rather than requiring an all-at-once overhaul.

Beyond practicality, fostering compatibility with traditional dimmers paves the way for inventive solutions that bridge old and new technologies. Developing advanced LED controllers that can interpret and respond to the signals from legacy dimmers introduces novel methods of enhancing performance and user satisfaction. For instance, such innovations could include adaptive drivers that dynamically optimize brightness and color consistency in response to dimmer settings or hybrid systems that transition effortlessly between traditional dimmer control and smart lighting functionality. These advancements not only make LED systems more versatile but also ensure that new technology respects and builds upon existing infrastructure, accelerating adoption while opening the door to groundbreaking inventions.

Lighting devices are ubiquitous in modern life, fulfilling essential roles in homes, workplaces, public spaces, and transportation systems. From compact flashlights to intricate chandelier systems, their diversity reflects the wide range of applications and consumer preferences. Each type is tailored for specific needs, such as high-intensity floodlights for outdoor use or ambient LEDs for indoor decor. The demand for these devices is robust, driven by their necessity in creating functional and aesthetic environments. However, this variety poses challenges for manufacturers, retailers, and logistics providers in managing inventory efficiently.

One of the significant challenges in stocking lighting devices is the unpredictability of consumer demand. While certain products, like standard bulbs, may sell consistently, niche items such as specialty lighting for art displays or seasonal decorative lights have more fluctuating demand. This unpredictability complicates forecasting, leading to either overstocking or shortages. Retailers must strike a delicate balance to avoid tying up capital in unsold inventory while ensuring that popular products remain available. As a result, inventory management becomes a critical factor in the lighting industry.

Given the high costs associated with maintaining a large inventory of diverse lighting products, there is a growing emphasis on minimizing stock volume. Retailers and manufacturers are exploring innovative ways to streamline their offerings without compromising consumer satisfaction. Compact, modular lighting solutions that can be expanded or customized during use are gaining traction. These designs reduce storage space requirements while offering flexibility for consumers, making them an appealing choice for both buyers and sellers.

Thickness plays a pivotal role in the design of light devices, as it directly impacts their functionality, aesthetic appeal, and overall usability. A thinner device can lead to enhanced portability and ease of integration into modern applications, such as consumer electronics, automotive lighting, and medical devices. Compactness often becomes a critical selling point, as it aligns with user preferences for sleeker and more space-efficient products. Furthermore, thickness affects thermal management and the structural integrity of the device, necessitating careful consideration during the design process.

From an optical performance perspective, the thickness of light devices influences how light is transmitted, diffused, or reflected within the system. The proper balance between thinness and material properties ensures optimal light distribution, minimizing losses and enhancing brightness and efficiency. For instance, reducing the thickness of optical layers or lenses without compromising their refractive index can improve the device's performance while maintaining a compact form factor. Designers must therefore explore advanced materials and innovative techniques to achieve these performance goals.

Thickness is also a key factor in energy efficiency. Thinner devices often require less power for operation, as they may integrate more efficient light sources, such as LEDs or OLEDs, with minimal energy loss. However, this reduction in thickness must be balanced against the challenges of heat dissipation, which could compromise the device's lifespan or reliability. By carefully managing thickness and incorporating heat-dissipating components or materials, designers can enhance energy efficiency without compromising the device's durability.

Another critical consideration is manufacturing feasibility. While thinner devices offer several advantages, the reduction in thickness can introduce challenges in terms of production processes, material selection, and cost management. Manufacturing thinner components may require more precise machinery, advanced fabrication methods, or specialized materials, which could increase production costs. Balancing these factors while ensuring quality and performance is essential for creating a successful product that meets market demands.

Given these challenges and opportunities, it is beneficial to develop innovative structures that achieve a compact design with reduced thickness. This requires a comprehensive approach that integrates material science, thermal management, optical performance, and cost-effective manufacturing techniques. By addressing these factors in a cohesive manner, designers can create light devices that not only meet modern expectations for slim designs but also ensure durability, functionality, and affordability.

SUMMARY

In some embodiments, a lighting apparatus includes a back cover, a light source, a surrounding wall and a light cover.

The light source is disposed to an inner side of the back cover.

The surrounding wall has a top edge and a bottom edge.

The back cover is attached to the top edge of the surrounding wall.

The light cover has a top ridge and a bottom ridge.

The top ridge and the bottom ridge of the light cover are disposed to clip a protruding structure of the surrounding wall to fix the light cover to the surrounding wall.

The light of the light source is emitted downwardly and passes through the light cover.

In some embodiments, a first bottom surface of the bottom ridge is aligned with a second surface of the bottom edge of the surrounding wall.

In some embodiments, the protruding structure has a top rim and a bottom rim.

The top rim engages the top ridge and the bottom rim engages the bottom ridge.

In some embodiments, a buffer space is disposed between the top rim and the bottom rim.

In some embodiments, the surrounding wall has an inner ridge.

A concealing loop is placed between the inner ridge and the top ridge.

In some embodiments, the back cover has an exterior side.

There are a first groove and a second groove disposed on the exterior side for attaching to an installation bracket.

In some embodiments, the installation bracket has a first pin plugged into the first groove and a second pin plugged into the second groove.

In some embodiments, the first groove is formed by raising a first part of the back cover above a surface plane of the back cover.

In some embodiments, when the first pin is plugged into the first groove, a first buckle structure fixed the first pin to the first groove.

In some embodiments, the light source includes two rows of LED modules.

A driver is disposed between the two rows of LED modules for providing driving currents to the LED modules.

In some embodiments, there are more than one types of LED modules disposed on the two rows.

The driver is configured to adjust a light parameter of the two rows of LED modules.

In some embodiments, a manual switch is disposed on an exterior side of the back cover for a user to manually adjust a setting for the driver to determine the light parameter.

In some embodiments, the driver includes a driver circuit and a driver cover.

The driver cover reflects a light of the light source toward the light cover.

In some embodiments, the driver cover has a tilt angle instead of being perpendicular to the inner side of the back cover for enhancing reflecting the light toward the light cover.

In some embodiments, an antenna is disposed on an exterior surface of the driver cover for receiving a wireless signal.

In some embodiments, an auxiliary light source is disposed on an exterior surface of the driver box.

In some embodiments, the surrounding wall form a rectangular shape.

In some embodiments, there are multiple lenses corresponding multiple LED modules of the light source.

In some embodiments, the light cover is a diffusion layer.

The diffusion layer has different diffusion level at different regions.

In some embodiments, a middle region of the light cover has higher transparency than peripheral region of the light cover.

DETAILED DESCRIPTION

Figure 7:
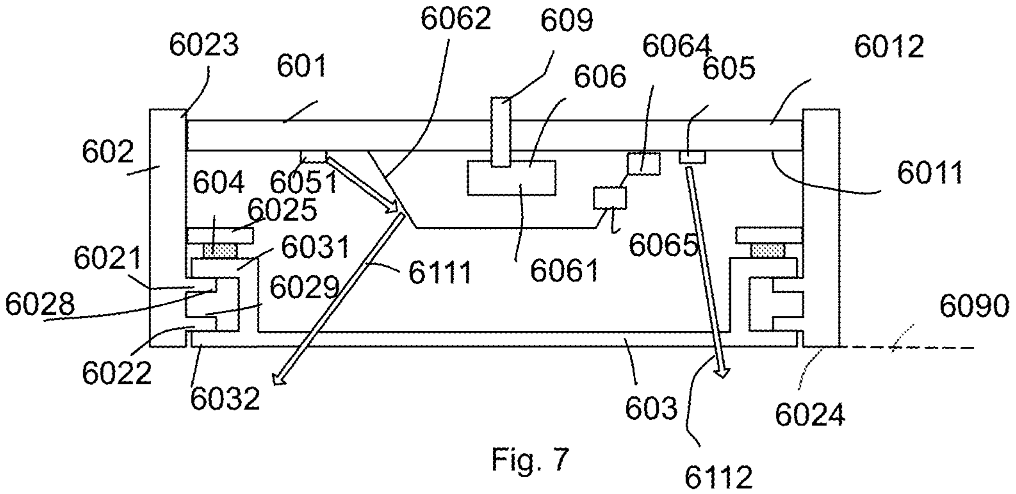
FIG. 7 shows another lighting apparatus.

In FIG. 7, a lighting apparatus includes a back cover 601, a light source 605, a surrounding wall 602 and a light cover 603.

The light source 605 is disposed to an inner side 6012 of the back cover 601.

The surrounding wall 602 has a top edge 6023 and a bottom edge 6024.

The back cover 601 is attached to the top edge 6023 of the surrounding wall 602.

The light cover 603 has a top ridge 6031 and a bottom ridge 6032.

The top ridge 6031 and the bottom ridge 6032 of the light cover 603 are disposed to clip a protruding structure 6028 of the surrounding wall 602 to fix the light cover 603 to the surrounding wall 602.

The light 6112 of the light source 605 is emitted downwardly and passes through the light cover 603.

In some embodiments, a first bottom surface of the bottom ridge 6024 is aligned with a second surface of the bottom edge 6032 of the surrounding wall 602. In FIG. 7, the dashed line 6090 indicate the aligned surface plane of the bottom ridge 6032 and the bottom edge of the surrounding wall.

In some embodiments, the protruding structure has a top rim 6021 and a bottom rim 6022.

The top rim 6021 engages the top ridge 6031 and the bottom rim 6022 engages the bottom ridge 6032.

In some embodiments, a buffer space 6029 is disposed between the top rim 6021 and the bottom rim 6022.

In some embodiments, the surrounding wall has an inner ridge 6025.

A concealing loop 604 is placed between the inner ridge 6025 and the top ridge 6031.

In some embodiments, the back cover 601 has an exterior side 6012.

Figure 9:
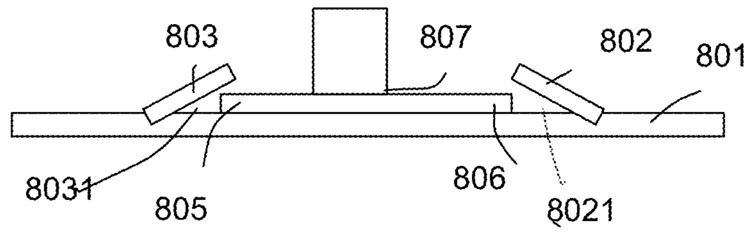
FIG. 9 shows back cover installation structure.

In FIG. 9, there are a first groove 8031 and a second groove 8021 disposed on the exterior side of the back cover 801 for attaching to an installation bracket 807 to fix to an installation platform, e.g. a cavity of a ceiling.

In some embodiments, the installation bracket has a first pin 805 plugged into the first groove 8031 and a second pin 806 plugged into the second groove 8021.

In some embodiments, the first groove is formed by raising a first part 803 of the back cover 801 above a surface plane of the back cover 801. Same is made to a second part 802 of the back cover is raised from the back cover 801. For example, the first part 803 and the second part 804 are stamped and raised so that the back cover 801 is a metal plate with two protruding parts forming the first groove and the second groove.

In some embodiments, when the first pin is plugged into the first groove, a first buckle structure fixed the first pin to the first groove.

Figure 8:
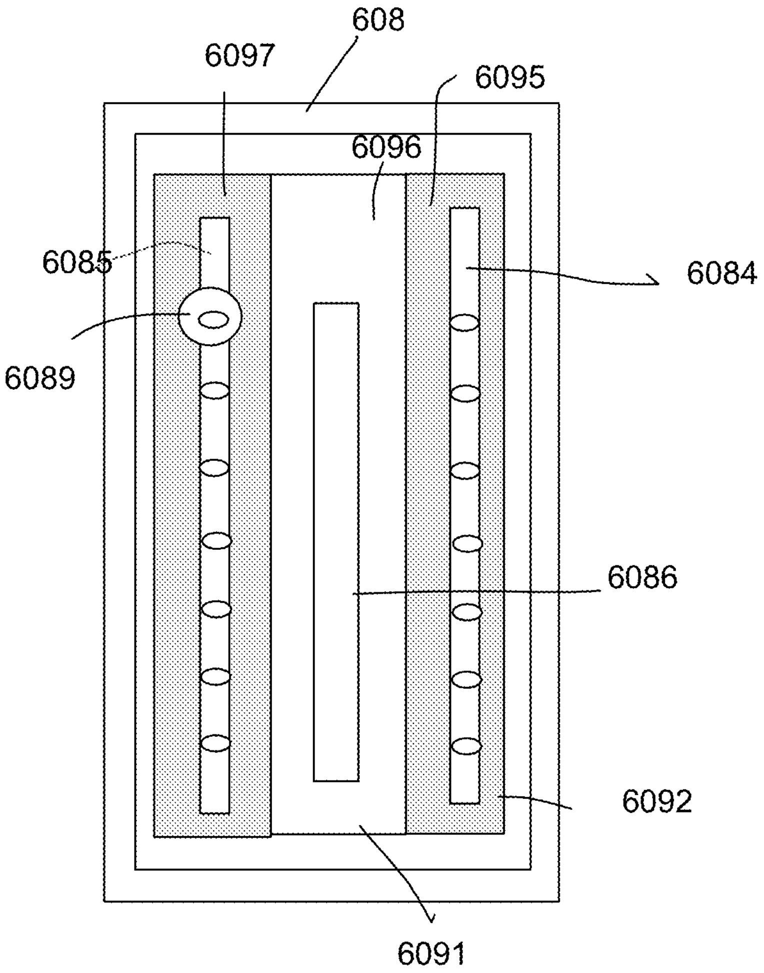
FIG. 8 shows a layout.

In FIG. 8, the light source includes two rows 6084, 6085 of LED modules.

A driver 6086 is disposed between the two rows 6084, 6085 of LED modules for providing driving currents to the LED modules.

In FIG. 7, there are more than one types of LED modules 6051 disposed on the two rows.

The driver 606 is configured to adjust a light parameter of the two rows of LED modules.

In some embodiments, a manual switch 609 is disposed on an exterior side of the back cover 601 for a user to manually adjust a setting for the driver to determine the light parameter.

In some embodiments, the driver includes a driver circuit 6061 and a driver cover 6062.

The driver cover 6062 reflects a light 6111 of the light source toward the light cover 603.

In some embodiments, the driver cover has a tilt angle, as illustrated in FIG. 7 instead of being perpendicular to the inner side of the back cover for enhancing reflecting the light toward the light cover.

In some embodiments, an antenna 6064 is disposed on an exterior surface of the driver cover 6062 for receiving a wireless signal.

In some embodiments, an auxiliary light source 6065 is disposed on an exterior surface of the driver box 6062.

In FIG. 8, the surrounding wall form a rectangular shape 608.

In some embodiments, there are multiple lenses 6089 corresponding multiple LED modules of the light source.

In some embodiments, the light cover is a diffusion layer.

The diffusion layer has different diffusion levels at different regions.

In some embodiments, a middle region of the light cover has higher transparency than peripheral region of the light cover.

For example, in FIG. 8, there are three regions 6095, 6096 and 6097. The two peripheral regions 6095 and 6096 are closer to light source and is given a different diffusion level, e.g. transparency as the middle region 6096 that is farther from the light source. Such design make the final light output more soft and even.

Please refer to FIG. 1 through FIG. 4 for an explanation of the lamp housing provided by an embodiment of the present utility model. The lamp housing includes a surrounding wall 1 and a light cover 2. A protruding part 11 is formed on the inner sidewall of the surrounding wall 1 and extends along its circumference. The top surface of the light cover 2 features a ridge 21 that extends upward and outward, distributed along the circumference of the light cover 2. The ridge 21 is positioned on the top surface of the protruding part 11. The bottom surface of the light cover 2 is coplanar with the bottom surface of the surrounding wall 1.

It should be noted that the terms "top" and "bottom" are based on the orientation of the lamp housing after installation onto a mounting surface. The side facing the mounting surface is referred to as the "top," while the side facing away from it is the "bottom." The mounting surface can include ceilings, walls, cabinets, and similar structures.

The bottom surface of the surrounding wall 1 is an open surface, and the light cover 2 is installed at this opening. The cross-sectional shape of the surrounding wall 1 matches the structure of the light cover 2, enabling the light cover 2 to seal or nearly seal the inner cavity of the surrounding wall 1.

The surrounding wall 1 and light cover 2 can take various shapes, such as circular, oval, or polygonal. The protruding part 11 extends circumferentially along the surrounding wall 1 and may be formed as an integrated ring surrounding the circumference or segmented along the inner wall of the surrounding wall 1. Similarly, the ridge 21 extends circumferentially along the light cover 2 and can either form an integrated ring along its circumference or be segmented on the top surface of the light cover 2.

Figure 2:
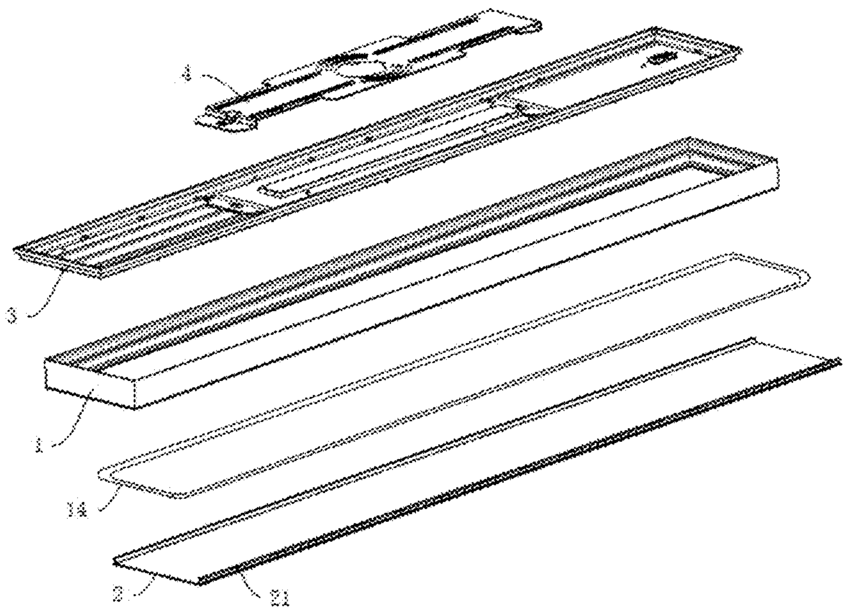
FIG. 2 is an exploded structural schematic diagram of the lamp housing provided by an embodiment of the present utility model.

As shown in FIG. 2, the light cover 2 and surrounding wall 1 are illustrated as having a rectangular structure. For rectangular structures, the ridge 21 is positioned along the two longer edges of the light cover 2's top surface to facilitate installation and enhance stability. For circular or polygonal light covers, the ridge 21 is preferably positioned along the outer edge of the light cover 2's top surface and is distributed in segments.

Figure 3:
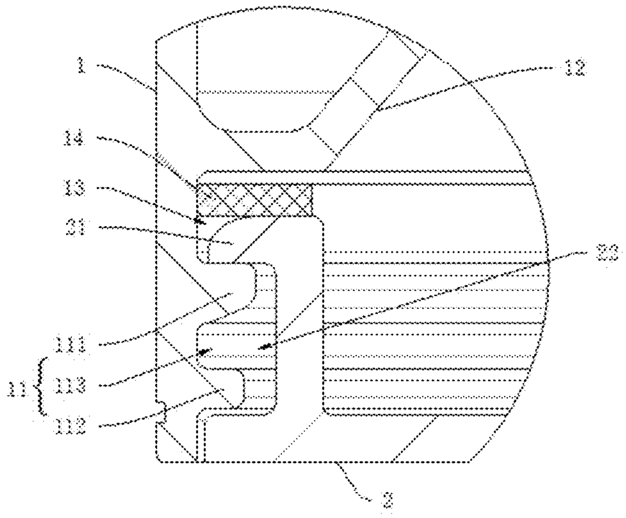
FIG. 3 is an enlarged structural schematic diagram of area A in FIG. 1.

Specifically, the ridge 21 is integrally formed with the light cover 2, and its longitudinal cross-section is shaped like the numeral "7," as shown in FIG. 3. The horizontal portion of the ridge 21 rests on the top surface of the protruding part 11, while the vertical portion, having a smaller width, can slightly deform inward toward the center of the light cover 2. This design allows for minor flexibility, facilitating assembly.

When assembling the light cover 2 with the surrounding wall 1, one part of the light cover 2 is first inserted into the surrounding wall 1 so that the ridge 21 rests on the corresponding protruding part 11. Then, the light cover 2 is rotated or elastically pressed, causing the ridge 21 to slightly deflect inward toward the center of the light cover 2. This deflection allows the ridge 21 to snap securely onto the protruding part 11.

Since the light cover 2 requires some deflection during installation, its outer diameter is slightly smaller than the inner diameter of the opening at the bottom of the surrounding wall 1. In other words, there is a small gap between the outer edge of the light cover 2 and the inner wall of the bottom edge of the surrounding wall 1.

Compared with existing designs, the lamp housing provided by this utility model achieves a secure connection between the light cover 2 and the surrounding wall 1 through the ridge 21 resting on the protruding part 11. Both the ridge 21 and the protruding part 11 are concealed within the surrounding wall 1, allowing the bottom surface of the light cover 2 and the bottom surface of the surrounding wall 1 to remain flush, ensuring a seamless and aesthetically pleasing exterior. Additionally, the ridge 21 and the protruding part 11 allow for elastic pressing during installation, enabling the ridge 21 to deflect slightly for easy snapping onto the protruding part 11. This snap-fit design allows the light cover 2 and the surrounding wall 1 to be created in various shapes, addressing the limitation of single-structure designs.

In some embodiments, as shown in FIG. 3, the ridge 21 and the top surface of the light cover 2 form a limiting groove 22, where the protruding part 11 is embedded. Preferably, the bottom surface of the protruding part 11 rests against the top surface of the light cover 2. The ridge 21, with its "7"-shaped cross-section, creates a limiting groove 22 that opens toward the outer edge of the light cover 2. This design ensures that the protruding part 11 fits snugly into the groove, further enhancing the snap-fit connection and providing vertical positioning to increase the stability and strength of the light cover 2's attachment.

Since the protruding part 11 must fit into the limiting groove 22, its vertical thickness should match the height of the groove. To address potential dimensional mismatches that could hinder assembly, as shown in FIG. 3, the protruding part 11 is divided into a first boss 111 and a second boss 112, spaced vertically apart to form a buffer groove 113 in between. The ridge 21 rests against the top surface of the first boss 111.

The first boss 111 and the second boss 112 are spaced apart, forming the buffer groove 113 between them, which allows for slight vertical deformation. When the ridge 21 presses against the top surface of the first boss 111, the first boss 111 is compressed and fits into the limiting groove 22. When the top surface of the light cover 2 comes into contact with the bottom surface of the second boss 112, it also compresses the second boss 112, allowing it to fit into the limiting groove 22.

The buffer groove 113 provides the protruding part 11 with space for slight deformation, making it easier to fit the protruding part 11 into the limiting groove 22 during assembly. This also simplifies the precision requirements for manufacturing the protruding part 11.

Figure 1:
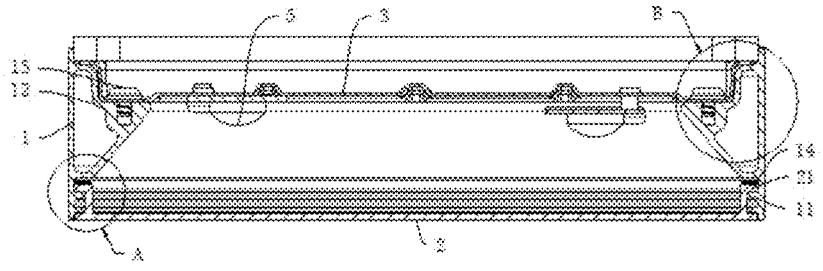
FIG. 1 is a cross-sectional schematic diagram of the lamp housing provided by an embodiment of the present utility model.

In some embodiments, as shown in FIG. 1, FIG. 2, and FIG. 3, the inner sidewall of the surrounding wall 1 is also equipped with a mounting section 12 located above the protruding part 11. The mounting section 12 extends along the circumference of the surrounding wall 1 and forms a sealing groove 13 with the protruding part 11. The upper end of the ridge 21 is positioned within the sealing groove 13, and a sealing strip 14 is compressed between the top surface of the ridge 21 and the bottom surface of the mounting section 12.

The sealing strip 14 ensures a tight seal between the light cover 2 and the surrounding wall 1, preventing impurities from entering the inner cavity of the surrounding wall 1 and contaminating the light source module 5. Specifically, the sealing strip 14 is adhered to the bottom surface of the mounting section 12. During assembly, the ridge 21 is snapped into the sealing groove 13, with its horizontal portion resting against the top surface of the protruding part 11, and its upper surface compressing the sealing strip 14. The sealing strip 14 is thus securely confined between the mounting section 12 and the ridge 21, ensuring an effective seal.

Because the ridge 21 is snapped into the sealing groove 13 rather than slid in, the sealing strip 14 is not subjected to pulling or deformation, which prevents issues such as curling or damage to the sealing strip 14's edges. This ensures the stability of the sealing strip 14's condition, improving its sealing performance and extending its service life.

Preferably, in the described embodiment, the protruding part 11 and the mounting section 12 are integrally formed along the inner wall of the surrounding wall 1, and the sealing strip 14 is annularly arranged within the sealing groove 13. Both the protruding part 11 and the mounting section 12 adopt an annular structure, ensuring the sealing strip 14 is securely fixed in place and providing excellent sealing performance between the surrounding wall 1 and the light cover 2.

It is worth noting that the ridge 21 is preferably arranged along the outer edge of the top surface of the light cover 2, distributed in segments with intervals. This design facilitates the installation of the light cover 2 and enhances its stability.

Figure 6:
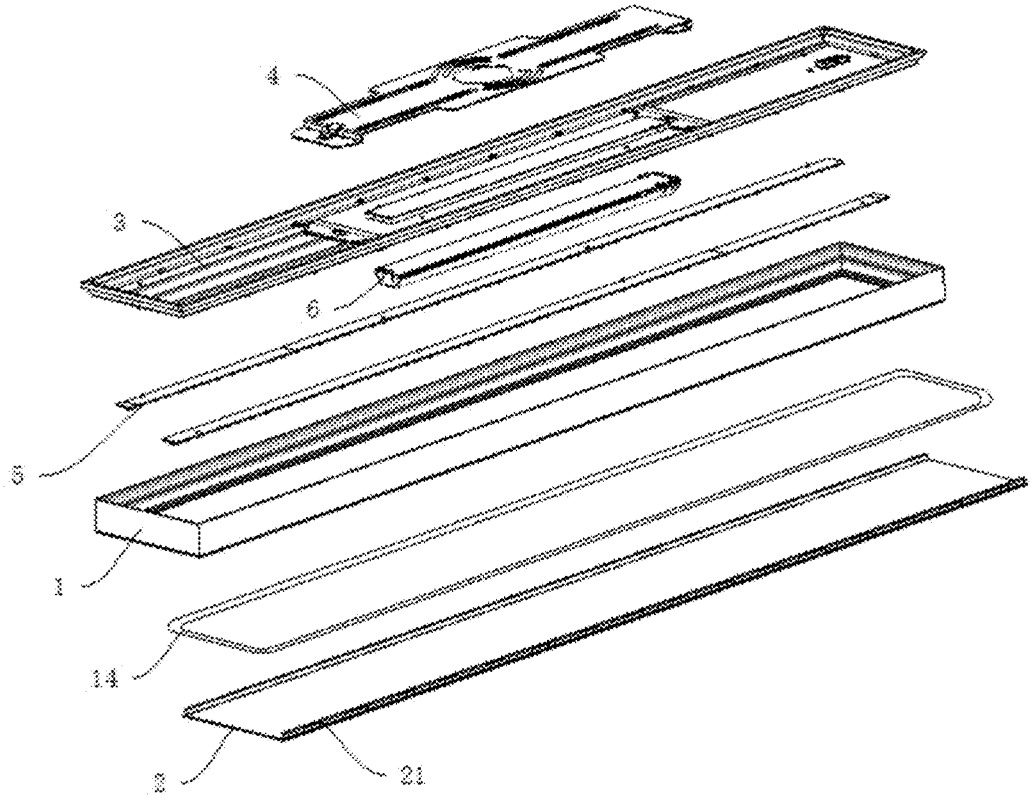
FIG. 6 is an exploded structural schematic diagram of the panel lamp provided by an embodiment of the present utility model.

In certain embodiments, as shown in FIG. 2 and FIG. 6, the lamp housing also includes a backplate 3. The backplate 3 is fixed to the top surface of the mounting section 12, enclosing the top opening of the surrounding wall 1. Together, the backplate 3, the surrounding wall 1, and the light cover 2 form a sealed installation cavity to accommodate the light source module 5.

Apart from the opening at the bottom of the surrounding wall 1, the top of the surrounding wall 1 is also open, simplifying the overall structure of the lamp housing. This design facilitates the manufacturing and assembly of individual components and provides convenient access for installing the light source module 5. The backplate 3 is fixed to the top opening of the surrounding wall 1, specifically to the top surface of the mounting section 12, sealing the upper opening. Preferably, a sealing strip is also installed between the backplate 3 and the mounting section 12. The light source module 5 is securely fixed to the backplate 3.

Figure 4:
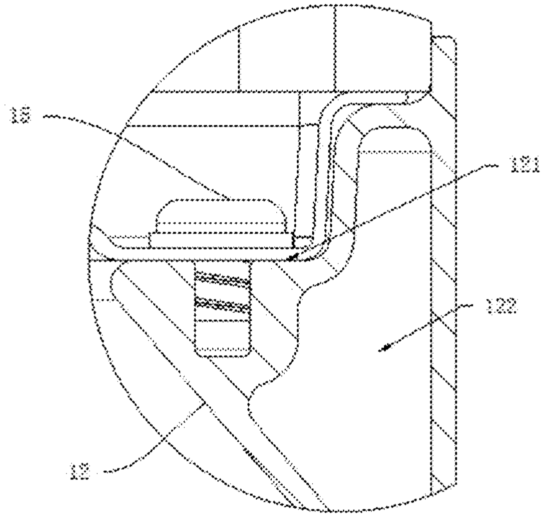
FIG. 4 is an enlarged structural schematic diagram of area B in FIG. 1.

As shown in FIG. 4, in certain embodiments, the top surface of the mounting section 12 includes a stepped surface 121. The outer edge of the backplate 3 rests on this stepped surface 121 and is connected to the mounting section 12 via fasteners 15. The stepped surface 121 and the outer edge of the backplate 3 are designed to match, meaning the outer edge of the backplate 3 also has a stepped structure. This design increases the contact area between the backplate 3 and the mounting section 12, enabling stable positioning in both the vertical and radial directions. Consequently, the connection between the backplate 3 and the surrounding wall 1 is more secure and stable.

In certain embodiments, as shown in FIG. 4, the width of the mounting section 12 protruding into the inner cavity of the surrounding wall 1 is greater than that of the protruding part 11. This allows the mounting section 12 to form the stepped surface 121. Additionally, the mounting section 12 includes a weight-reduction cavity 122, which extends circumferentially along its length. The longitudinal cross-section of the mounting section 12 resembles a triangular structure, with its top surface serving as the stepped surface 121 and its bottom surface as a flat plane, connected by a sloped surface. Similarly, the longitudinal cross-section of the weight-reduction cavity 122 also resembles a triangular structure, which helps reduce the overall weight of the surrounding wall 1 and facilitates manufacturing.

It should be noted that both the mounting section 12 and the protruding part 11 are integrally formed on the inner wall of the surrounding wall 1, ensuring structural integrity and stability.

Figure 5:
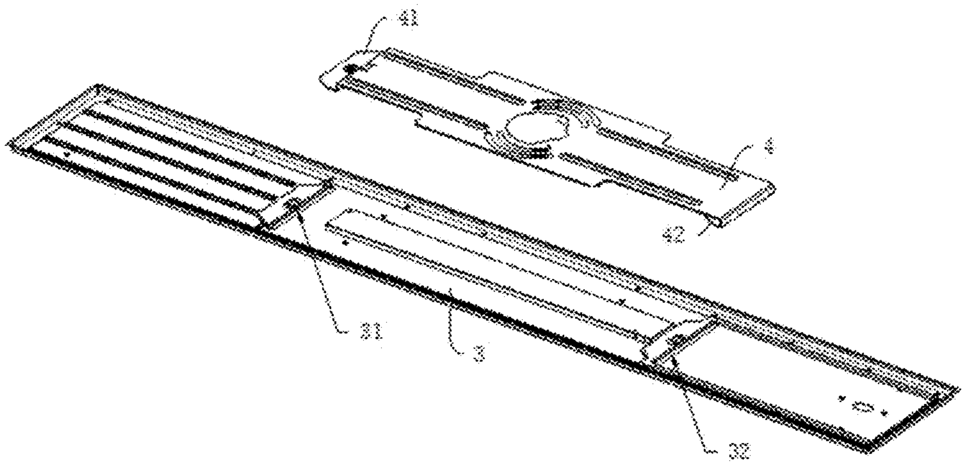
FIG. 5 is a schematic diagram of the connection relationship between the backplate and the fixing bracket of the lamp housing provided by an embodiment of the present utility model.

In certain embodiments, as shown in FIG. 2 and FIG. 6, the lamp housing further includes a fixing bracket 4. The fixing bracket 4 is inserted into the backplate 3 and positioned above it, enabling the lamp housing to be securely mounted onto a surface, such as a ceiling or wall. Specifically, as shown in FIG. 5, the backplate 3 is equipped with first and second insertion slots, 31 and 32, respectively, spaced apart from each other. The openings of both slots face outward in the same direction. The fixing bracket 4 has an outwardly extending first insertion plate 41 on one end and an inwardly bent second insertion plate 42 on the other end. The first insertion plate 41 fits into the first insertion slot 31, while the second insertion plate 42 fits into the second insertion slot 32.

During assembly, the fixing bracket 4 is pushed in one direction, causing the first insertion plate 41 to fit into the first insertion slot 31 and the second insertion plate 42 into the second insertion slot 32. This straightforward connection method simplifies assembly, improves efficiency, and reduces costs, as it eliminates the need for multiple additional components. Moreover, the first and second insertion plates block the openings of the corresponding insertion slots, ensuring that no visible gaps remain on the exterior surface of the lamp housing.

As shown in FIG. 6, based on the same inventive concept, this application also provides a panel lamp that includes the aforementioned lamp housing, a light source module 5, and a driver box 6. Both the light source module 5 and the driver box 6 are installed within the lamp housing.

The panel lamp benefits from the innovative lamp housing design, allowing it to adopt various aesthetic shapes while enhancing its overall appearance and functionality. This improved design ensures better sealing, stability, and ease of assembly, making the lamp both practical and visually appealing.

The lighting apparatus can be adapted to include a triangular or hexagonal surrounding wall, expanding its use for architectural designs where unique shapes are desired. These alternative geometries would allow the device to seamlessly integrate into spaces requiring unconventional fixtures, such as art installations or modern homes.

The light cover could also be designed with adjustable diffusion layers. For instance, the user could slide or rotate sections of the cover to alter diffusion levels dynamically. This design would be ideal for multifunctional spaces, allowing users to switch between ambient lighting and focused task lighting without replacing the fixture.

Another variation could involve integrating modular back cover components. The back cover might be designed with interchangeable panels to support specific installations, such as panels with pre-drilled holes for ceiling hooks or magnetic mounts for easy attachment to metallic surfaces. This would enhance the versatility of the lighting apparatus in various settings.

The protruding structure on the surrounding wall could feature a spring-loaded mechanism, allowing the light cover to snap into place more securely while accommodating slight dimensional variations. This would simplify installation and improve the device's robustness, particularly in environments where vibrations or impacts are common, such as in industrial facilities.

In a more advanced implementation, the light source could include a combination of warm and cool LED modules, with a control system allowing users to customize color temperature. This would make the apparatus suitable for environments where lighting ambiance plays a critical role, such as restaurants, hotels, or residential living spaces.

To enhance usability, the back cover could incorporate a smart sensor system. For example, motion sensors or ambient light sensors could be embedded to automatically adjust the brightness or turn the light on and off based on environmental conditions. This feature would improve energy efficiency and convenience for users.

The light cover could also include an integrated lens array, with each lens corresponding to an individual LED module. These lenses could focus the light into specific patterns, such as a grid or beams, for specialized applications like stage lighting or signage illumination.

For added functionality, the driver could include wireless connectivity features, enabling remote control of the lighting apparatus through a mobile app or smart home system. This would allow users to adjust light parameters such as brightness, color, and even lighting schedules from their devices.

The surrounding wall could incorporate a built-in heat sink, made of thermally conductive materials such as aluminum alloy. This feature would enhance thermal management, making the lighting apparatus suitable for high-power applications where heat dissipation is critical to maintaining performance and durability.

The surrounding wall could be designed with a modular configuration, allowing users to assemble multiple units together to form a larger lighting panel. This feature would be useful in commercial or industrial settings where scalable lighting solutions are needed, such as in warehouses or conference halls, enabling users to expand or reduce the size of the lighting apparatus as required.

An alternative light cover design could include micro-etched patterns on its surface to enhance light diffusion while maintaining a sleek appearance. These etched patterns could vary across the cover to produce unique lighting effects, such as gradients or decorative shadows, making the apparatus suitable for artistic or decorative applications.

The back cover could be equipped with a hidden compartment for housing additional components, such as backup batteries or emergency lighting modules. This would allow the lighting apparatus to function as a dual-purpose device, providing standard illumination and acting as an emergency light during power outages, enhancing its utility in critical environments like hospitals or evacuation routes.

The light source could feature a tunable spectrum with advanced control over wavelengths, enabling it to simulate natural sunlight or specific color temperatures. This design would be ideal for horticulture applications, where light wavelengths directly influence plant growth, or for health-focused spaces, where circadian lighting can improve well-being.

The surrounding wall could incorporate acoustic-dampening materials or perforations to serve as both a lighting and noise-reduction device. This dual-purpose design would be particularly effective in open office spaces or conference rooms, where controlling both lighting and acoustics is essential for productivity and comfort.

A variation of the installation bracket could include a pivoting mechanism, enabling the lighting apparatus to be tilted or rotated after installation. This feature would provide users with greater flexibility in directing light, making it suitable for retail displays, gallery lighting, or adjustable task lighting in workshops or kitchens.

To improve durability, the surrounding wall and back cover could be constructed from reinforced materials such as polycarbonate or stainless steel. These materials would make the lighting apparatus more resilient to impacts, weather, and wear, allowing it to be used in outdoor or high-traffic environments such as parking lots, building exteriors, or public facilities.

The driver could be integrated with an energy harvesting system, such as a small solar panel or kinetic energy generator, to reduce reliance on external power sources. This feature would make the apparatus more sustainable and ideal for remote locations or off-grid installations where energy efficiency is a priority.

The light cover could include an anti-glare coating or a honeycomb structure to minimize glare and improve visual comfort. This design would be particularly useful in settings like offices, libraries, or classrooms, where prolonged exposure to bright light can cause discomfort or strain on the eyes.

Lastly, the lighting apparatus could include interchangeable decorative panels on the exterior of the surrounding wall. These panels could feature different textures, colors, or patterns to match various interior design themes. This customization option would enhance the aesthetic appeal of the lighting apparatus, making it a versatile choice for both residential and commercial applications.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:

a back cover;

a light source, wherein the light source is disposed to an inner side of the back cover;

a surrounding wall, wherein the surrounding wall has a top edge and a bottom edge, wherein the back cover is attached to the top edge of the surrounding wall; and a light cover, wherein the light cover has a top ridge and a bottom ridge, wherein the top ridge and the bottom ridge of the light cover are disposed to clip a protruding structure of the surrounding wall to fix the light cover to the surrounding wall, wherein the light of the light source is emitted downwardly and passes through the light cover, wherein the protruding structure has a top rim and a bottom rim, wherein the top rim engages the top ridge and the bottom rim engages the bottom ridge.

2. The lighting apparatus of claim 1, wherein a first bottom surface of the bottom ridge is aligned with a second surface of the bottom edge of the surrounding wall.

3. The lighting apparatus of claim 1, wherein a buffer space is disposed between the top rim and the bottom rim.

4. The lighting apparatus of claim 1, wherein the surrounding wall has an inner ridge, wherein a concealing loop is placed between the inner ridge and the top ridge.

5. The lighting apparatus of claim 1, wherein the back cover has an exterior side, wherein there are a first groove and a second groove disposed on the exterior side for attaching to an installation bracket.

6. The lighting apparatus of claim 5, wherein the installation bracket has a first pin plugged into the first groove and a second pin plugged into the second groove.

7. The lighting apparatus of claim 6, wherein the first groove is formed by raising a first part of the back cover above a surface plane of the back cover.

8. The lighting apparatus of claim 6, wherein when the first pin is plugged into the first groove, a first buckle structure fixed the first pin to the first groove.

9. The lighting apparatus of claim 1, wherein the light source comprises two rows of LED modules, wherein a driver is disposed between the two rows of LED modules for providing driving currents to the LED modules.

10. The lighting apparatus of claim 9, wherein there are more than one types of LED modules disposed on the two rows, wherein the driver is configured to adjust a light parameter of the two rows of LED modules.

11. The lighting apparatus of claim 10, wherein a manual switch is disposed on an exterior side of the back cover for a user to manually adjust a setting for the driver to determine the light parameter.

12. The lighting apparatus of claim 9, wherein the driver comprises a driver circuit and a driver cover, wherein the driver cover reflects a light of the light source toward the light cover.

13. The lighting apparatus of claim 12, wherein the driver cover has a tilt angle instead of being perpendicular to the inner side of the back cover for enhancing reflecting the light toward the light cover.

14. The lighting apparatus of claim 12, wherein an antenna is disposed on an exterior surface of the driver cover for receiving a wireless signal.

15. The lighting apparatus of claim 12, wherein an auxiliary light source is disposed on an exterior surface of the driver box.

16. The lighting apparatus of claim 1, wherein the surrounding wall form a rectangular shape.

17. The lighting apparatus of claim 1, wherein there are multiple lenses corresponding multiple LED modules of the light source.

18. The lighting apparatus of claim 1, wherein the light cover is a diffusion layer, wherein the diffusion layer has different diffusion level at different regions.

19. The lighting apparatus of claim 18, wherein a middle region of the light cover has higher transparency than peripheral region of the light cover.

* * * * *